United States Patent [19]

Andres et al.

[11] 4,013,883

[45] Mar. 22, 1977

[54] PNEUMATIC CONTROL INSTALLATION FOR HEADLIGHTS

[75] Inventors: Rudolf Andres, Sindelfingen; Hermann Möller, Aidlingen, both of Germany

[73] Assignee: Daimler-Benz Aktiengesellschaft, Stuttgart, Germany

[22] Filed: Oct. 29, 1974

[21] Appl. No.: 518,893

[30] Foreign Application Priority Data

Oct. 30, 1973 Germany .................... 2354204

[52] U.S. Cl. .................... 240/7.1 LJ; 240/61.1
[51] Int. Cl.² .................... B60Q 1/04
[58] Field of Search ........... 240/7.1 LJ, 62.2, 62.3, 240/61.2, 61.3, 61.4, 61.5, 61.1, 41.62

[56] References Cited

UNITED STATES PATENTS 3,840,729  10/1974  Andres et al. .................... 240/7.1 LJ

*Primary Examiner*—L. T. Hix
*Assistant Examiner*—Alan Mathews
*Attorney, Agent, or Firm*—Craig & Antonelli

[57] ABSTRACT

A pneumatically operated control system for the automatic alignment of motor vehicle headlights in which a measuring transmitter at each axle of the motor vehicle determines the change in distance of the axle to the vehicle body and, cooperating with a pressure modulator, causes the alignment of the headlights to a constant light distance by way of a differential control element and a control shifting device; the control shifting device thereby includes a control rod engaging at the pivotal headlight which in case of pressure failure is clamped fast either directly or indirectly by a servo-adjusting motor which is operatively connected with the pressure line.

35 Claims, 6 Drawing Figures

PNEUMATIC CONTROL INSTALLATION FOR HEADLIGHTS

The present invention relates to a pneumatic control installation operating with vacuum or excess pressure for the automatic alignment of motor vehicle headlights with a measuring transmitter at each axle of the vehicle that cooperates with a pressure modulator and in dependence on the change in distance of the axle to the body of the motor vehicle aligns the headlights of the motor vehicle to a constant light distance by way of a differential control element and a control switch independently of the vehicle load, according to German Pat. No. 2,054,644. In one already previously proposed arresting mechanism (patent application of addition No. P 21 49 269.3 filed as a patent application of addition to the aforementioned German Patent), the headlights are fixed in case of a failure in the pressure system by an also pneumatically actuated operating or working element by means of a closure valve which ensures a stopping or arresting of the headlights in the position existing at the given instant. This stopping or arresting means, however, continues in existence only for a predetermined time when the pressure in the system collapses during a longer drive at full gas.

It is the aim of the present invention to eliminate this disadvantage and to retain the headlights in their position adjusted by the control of the system also when the system pressure fails for a longer or shorter period of time. A shorter period of time thereby means such a period of time which may result when driving at full gas, since then, for example, with a vacuum system, the pressure in the suction pipe is approximately equal to the atmospheric pressure, and, accordingly, no servo-energy is available. A longer period of time means that no servo-energy is available for a duration which cannot be predicted or anticipated because an airtight or leaky place has developed in the pressure system.

The underlying problems are solved according to the present invention in that the control shifting device includes a control rod engaging at the pivotal headlight which in case of a pressure decrease is fixed either directly or indirectly by a servo-adjusting motor operating with a diaphragm against the force of a spring and arranged in the pressure line. The servo-adjusting motor may thereby be equipped with a shifting rod which in case of a pressure failure engages into a toothed arrangement pivotal either directly or indirectly by the control shifting device and stops or arrests the same. The described toothed arrangement which is adjusted together with the headlight by an adjusting rod that engages directly at the teeth or at the headlight, may be constructed as toothed segment provided with toothed or knife edges which are directed toward a shifting rod terminating wedge-shaped which is actuated by the servo-adjusting motor.

On the other hand, an adjusting rod displaceable by a working element pneumatically connectd with the control shifting device may engage at an adjusting lever fastened at the headlight which carries the toothed arrangement and during its pivoting movement pivots along the headlight.

The toothed rod may also be connected by way of a lever with the headlight which is pivoted about its pivot axis by an adjusting rod directly engaging at the headlight.

By reason of the fact that the toothed segment describes a circular arc during its movement, the teeth of the toothed segment may be constructed circularly shaped for assuring a good engagement of the tooth or knife edges of the shifting rod.

In the case that with a fully loaded luggage space and adjusted headlights a defect occurs in the pressure system and then the headlights could not be correctly adjusted again with an unloaded luggage space before the pressure system can be repaired, a mechanical auxiliarly mechanism is provided which in such a case can be actuated at will. For that purpose the wedge-shaped knife edge of the shifting rod can be pressed or pulled mechanically out of the knife edges against the pressure of the spring incase of such a pressure failure. The shifting rod then has to be extended so far that it extends through the housing and is provided thereat with a push button or a pull knob.

The automatic stop or arresting mechanism may also be directly connected with the adjusting unit, i.e., with the control shifting device and may be so constructed that the servo-adjusting motor includes a clamping mechanism which holds fast the control rod in the given case. With such a construction, the control rod controlled by the control shifting device may extend through the servo-adjusting motor and in case of a pressure failure the spring pressing against its diaphragm may cause a slide member running along an inclined surface to clamp itself fast at the control rod and to stop or arrest the same thereby. Advantageously, the control rod is thereby roughened up or provided with a serration or teeth at those places at which the slide member is to clamp fast, into which engage corresponding serrations or teeth arranged at the slide members. The slide members themselves may consist advantageously of conventional synthetic resinous thermoplastic materials which has self-lubrication properties.

If the control installation operates with vacuum, then it receives customarily vacuum in the entire pressure system is connected to the suction pipe of the motor vehicle engine. For a headlight control system operating with vacuum, a storage tank or reservoir is then generally provided which is connected with the suction pipe of the motor vehicle engine by way of a check valve. This storage tank or reservoir may thereby be dimensioned considerably smaller than with the aforementioned prior art construction so that in addition to a decrease in cost, also a space saving is achieved. According to a further feature of the present invention, it is appropriate if the servo-adjusting motor is pneumatically connected with the vacuum system between the check valve and the storage container.

Accordingly, it is an object of the present invention to provide a pneumatically operating control system for automatically aligning motor vehicle headlights which avoids by simple means the aforementioned shortcomings and drawbacks encountered in the prior art.

Another object of the present invention resides in a pneumatically operating control installation for automatically aligning the headlights of motor vehicles in dependence on the change in the distance of the axle to the body of the motor vehicle which locks the headlights in the previously existing adjusted position in case of failure of the pneumatic system.

A further object of the present invention resides in a control system for the automatic alignment of motor vehicle headlights of the type described above which fixes the headlights in case of failure in the pressure system regardless of whether such failures occur for short or longer durations of time.

Still another object of the present invention resides in a control system of the type described above which is simple in construction yet enables a mechanical override to adjust the headlights to another position in case of failure of the pneumatic system in the event that changes in the load of the vehicle occur, for example, in the luggage space therof.

Another object of the present invention resides in a control installation for the automatic alignment of motor vehicle headlights which provides emergency operation, yet is relatively space-saving.

These and further objects, features and advantages of the present invention will become more apparent from the following description when taken in connection with the accompanying drawing which shows, for purposes of illustration only, several embodiments in accordance with the present invention, and wherein.

Figure 4:
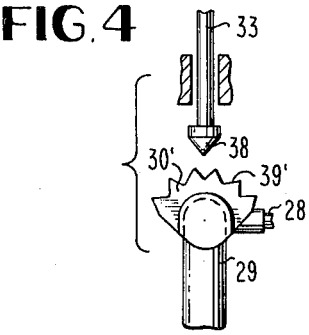
Figure 3:
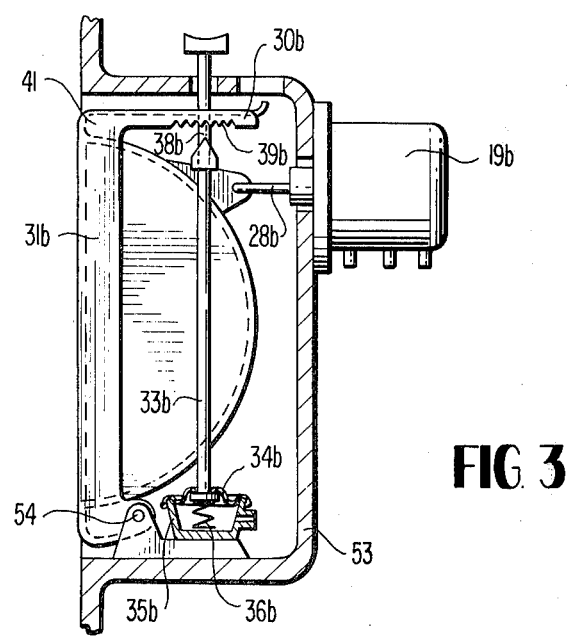

FIG. 3 is a cross-sectional view through a headlight housing, at which are arranged the control shifting device and which is arranged the vacuum system servo-adjusting motor in accordance with the present invention as well as the headlights which are pivotally secured in the housing in a modified manner; and FIG. 4 is a partial schematic view of an alternative embodiment of a headlight lock construction in accordance with the present invention.

Figure 5:
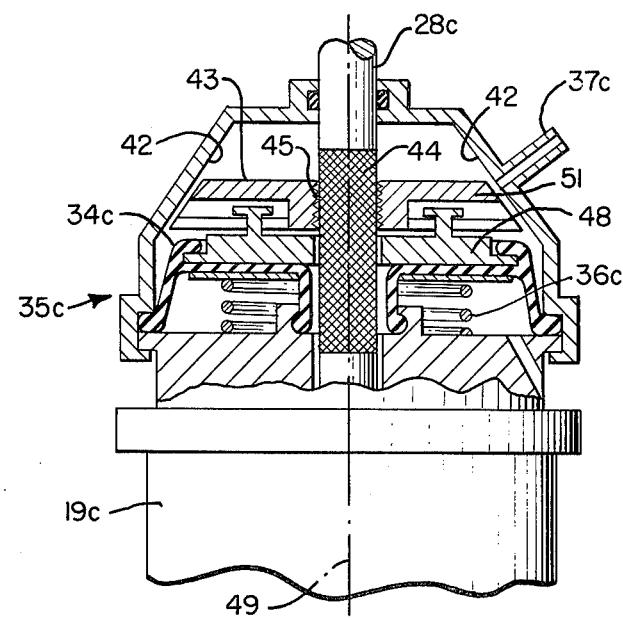
Figure 6:
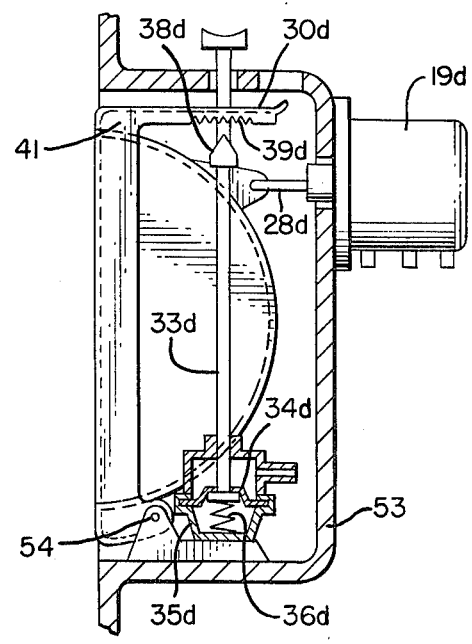

FIG. 5 is a elevational view, partially in cross section, of an excess pressure system servo-adjusting motor arranged at the control shifting device in accordance with the present invention with a control rod adapted to be fixed and extending through the servo-adjusting motor; and FIG. 6 is a cross-sectional view through a headlight housing, at which are arranged the control shifting device and in which is arranged an excess pressure system servo-adjusting motor in accordance with the present invention as well as the headlights which are pivotally secured in the housing in a modified manner.

Figure 1:
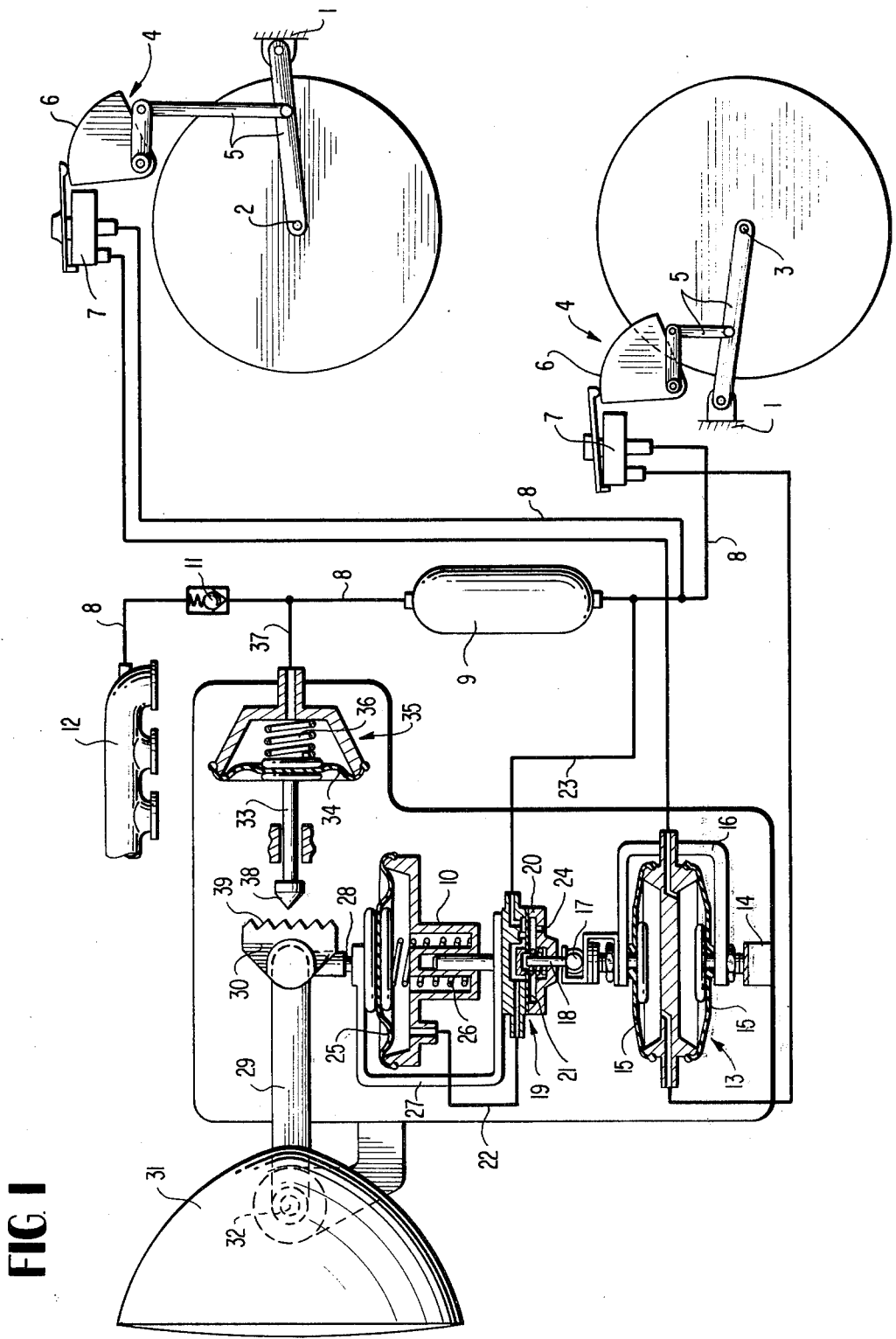
FIG. 1 is a schematic view of a headlight-adjusting installation in accordance with the present invention with two wheel axles and the measuring transmitters thereof as well as the control installation connected to the headlights and the vacuum system connected thereto.

Referring now to the drawing wherein like reference numerals are used throughout the various views to designate like parts, and more particularly to FIG. 1, measuring transmitters generally designated by reference numeral 4 which are of conventional construction, for example, in the form of conventional pick-ups or transducers, are arranged at the body 1 of the otherwise not illustrated motor vehicle in the usual manner in proximity of the rear axle 2 and of the front axle 3. The measuring transmitters 4 transmit changes of the distances of the axles with respect to the body 1 to conventional pressure modulators 7 by way of a lever linkage 5 including control cams 6. These pressure modulators 7 are connected by means of lines 8 with the suction pipe 12 of the internal combustion engine (not shown) of the motor vehicle by way of a storage tank or reservoir 9 and a check valve 11. A differential control element generally designated by reference numeral 13 is acted upon by the vacuum modulated by the pressure modulators 7 in dependence on the position of the body 1 with respect to the corresponding coordinated axle 2 or 3, against the force of an externally disposed spring 14 extending about the same. The diaphragms 15 are connected with a mushroom piston 18 of a control shifting element generally designated by reference numeral 19 by means of an angularly bent rod 16 also extending about the differential control element 13 and by way of a ball joint 17. The control shifting device 19 is so constructed that the mushroom piston 18 displaceably arranged in a flat cylindrical housing 20 acts on a diaphragm 21 of the control shifting device 19 in dependence on the movement of the diaphragm 15 in such a manner that either a preferably flexible line 22 is connected with an also preferably flexible line 23 branching off from the line 8, or that the line 22 is in communication with the atmosphere by way of a passage 24 in the bottom of the housing 20. The vacuum which builds up in a second adjusting motor, namely, the working or operating element 10 acts on a diaphragm 25 which is pulled in or retracted against the force of a spring 26. An adjusting rod 27 extending about the operating element 10 is connected at one end with the diaphragm 25 of the working element 10 and at the other end thereof with the housing 20 of the control shifting device 19. An adjusting rod 28 adjoins the diaphragm 25 which is connected with an adjusting lever 29, at the free end of which is provided a toothed segment 30. The adjusting lever 29 engages at the headlight 31 so that during the pivoting of the adjusting lever 29 the headlight 31 is pivoted about its pivot axis 32. As shown in FIG. 4, the toothed segment 30', may be in the shape of a circular arc having teeth 39' disposed thereon for engagement with the wedge-shaped knife edge 38 thereby assuring a good engagement of the tooth and knife edges of the shifting rod 33.

A shifting rod 33 is arranged opposite the toothed segment 30, which is provided with a diaphragm 34 that operates on the inside of a servo-adjusting motor generally designated by reference numeral 35 against the force of a spring 36. The servo-adjusting motor 35 is connected by way of a line 37 with the section of the line 8 extending between the check valve 11 and the reservoir tank 9. In the case of an absent vacuum in the described line section, the diaphragm 34 together with the shifting rod 33 rapidly jumps forwardly and protrudes with its wedge-shaped knife edge 38 against the toothed segment 30 and engages in the individual teeth which, for reasons of the safe engagement, are constructed as knife edges 39. As a result thereof, the headlight 31 is fixed mechanically in the position into which it was adjusted prior to the failure of the servo energy.

Figure 2:
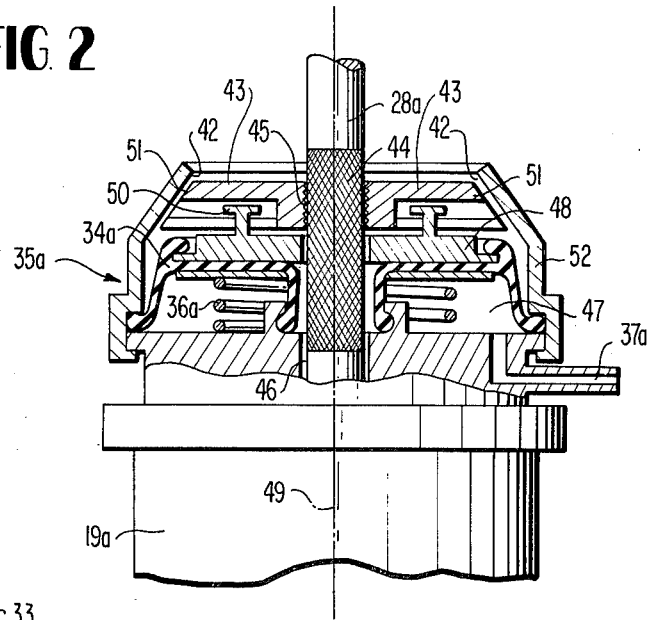
FIG. 2 is an elevational view, partially in cross section, of a servo-adjusting motor arranged at the control shifting device in accordance with the present invention with a control rod adapted to be fixed and extending through the servo-adjusting motor.

Of the headlight-adjusting installation illustrated in FIG. 2, only the end face of the control shifting device 19a together with the adjusting rod 28a is illustrated in FIG. 2. The servo-adjusting motor generally designated by reference numeral 35a is so mounted on this control shifting device 19a that the adjusting rod 28a extends through a central aperture 46 provided for that purpose in the servo-adjusting motor 35a. The servo-adjusting motor 35a is connected by way of the line 37a with the reservoir 9. The spring 36a pressure against the diaphragm 34a. If a vacuum prevails in the chamber 47, then the spring 36a is compressed. A disk 48 is enclosed by the diaphragm 34a. This disk 48 is displaceable together with the diaphragm 34a in the direction of axis 49. Slide members 43 are connected with the disk 48 by way of T-shaped extensions 50; the slide members 43 are provided with inclined surfaces 51 which are able to slide along the inclined surfaces 42 of the housing 52 of the servo-adjusting motor 35a. If the vacuum now fails in the chamber 47, i.e., if no vacuum is present therein, then the spring 36a presses the diaphragm 34a and therewith the disk 48 in the upward direction. During this movement the slide members 43 are also taken along in the upward direction which are then displaced inwardly since the inclined surfaces 51 thereof have to slide along the inclined surfaces 42. As a result thereof, the serrations or teeth 45 clamp fast at the serrations or toothed arrangement 44 of the adjusting rod 28a and arrest the same. The slide members 43 are made appropriately of a self-lubrication thermoplastic material of any conventional type so that a low coefficient of friction is available for the friction of the inclined surfaces 42 and 51 with respect to one another. With the use of a thermoplastic material, it also suffices under certain circumstances if in lieu of the serrations or teeth 44 the adjusting rod 28a is only roughened up at those places provided for the engagement of the slide members 43.

The embodiment illustrated in FIG. 3 operates similarly to that illustrated in FIG. 1 with a shifting rod engaging in a toothed arrangement. Only the control shifting device 19b and the servo-adjusting motor 35b are arranged differently in the embodiment of FIG. 3. The control shifting device 19b is secured externally at the headlight housing 53. Its adjusting rod 28b engages with a distance from the pivot axis 54 of the headlight 31b in the tangential direction of the aforementioned pivot axis 54. A toothed segment 30b is connected with the headlight 31b which includes knife edges 39b. The knife edge 38b of the shifting rod 33b, which terminates wedge-shaped, engages in these knife edges 39b; the shifting rod 33b is displaced by the spring 36b in the servo-adjusting motor 35b in the direction toward the knife edge 39b when the pressure collapses in the servo-adjusting motor 35b.

In all the described embodiments, the headlight is fixed mechanically in the position to which it was adjusted just prior to failure of the servo-energy. As long as the servo-energy is absent, the vehicle can now be driven for any desired long distances with an optimum headlight adjustment for the load condition existing up to the point prior to failure of the servo-energy. It is possible thereby to use a relatively smaller storage tank or reservoir 9 as compared to the other constructions. Additionally, the described control installation demonstrates that one can obtain with few and simple parts a reliable failure safety system.

In contrast to the embodiments described in connection with FIGS. 1–3, as shown in FIGS. 5 and 6 a safety failure system may also be operated with excess or above atmospheric pressure.

On the headlight-adjusting installation illustrated in FIG. 5, only the end face of the control shifting device 19c together with the adjusting rod 28c is illustrated in such FIG. The servo-adjusting motor generally designated by the reference numeral 35c is mounted on the control shifting device 19c so that the adjusting rod 28c extends through a central aperture provided in the servo-adjusting motor 35c. The servo-adjusting motor 35c is connected by way of a line 37c with a reservoir or the like with the spring 36c pressing against the diaphragm 34c. If an excess or above atmospheric pressure prevails above the diaphragm 34c the spring 36a is compressed; however, as with the embodiments of FIGS. 1–3, should a failure occur then the spring 36c presses the diaphragm 34c and therewith the disc 48 in the upward direction. During this movement the slide members 43 are taken along in the upward direction and are displaced inwardly since the inclined surfaces 51 slide along the inclined surfaces 42 whereby the serations or teeth 45 clamp fast at the serations or tooth arrangement 44 of the adjusting rod 28c and arrest the same.

In FIG. 6, the control shifting device 19d is secured externally at the headlight housing 53 with the adjusting rod 28d engaging with a distance from the pivot axis 54 of the headlight in the tangential direction to the pivot axis 54. A toothed segment 30d is connected with the headlight and includes a knife edge 39b. The knife edge 38d of the shifting rod 33d, which terminates wedge-shaped, engages the knife edges 39d; the shifting rod 33d is displaced by spring 36d of the servo-adjusting motor 35d in the direction toward the knife edge 39d when the pressure collapses in the servo-adjusting motor 35d.

Additionally, a manual over-ride may also be provided which would make it possible to mechanically adjust the headlights, if so desired, even though the pressure system has failed. This can be achieved in that, for example, the wedge-shaped knife edge 38 or 38b of the adjusting rod 33 or 33b is mechanically disengaged out of the knife edges 39 or 39b. It is only necessary to extend the rods 33 and 33b and provide the same with a suitable actuating knob enabling mechanical, manual disengagement. An analogous arrangement is also possible in connection with FIG. 2 in which, however, a pull rod will then be required to disengage the corresponding adjusting rod.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A pneumatically operating control installation for the automatic alignment of motor vehicle headlights which comprises means for aligning the headlights of the motor vehicle so as to have a constant light range essentially independently of the load of the vehicle including transmitter means measuring the change in distance of a respective axle with respect to the body of the motor vehicle, pressure modulator means operatively connected with the transmitter means and differential control means and control shifting means operatively connected with the pressure modulator means, characterized in that the control shifting means includes a control rod means engaging at the pivotal headlight, and servo-adjusting motor means for holding fast said control rod means in case of a pressure failure.

2. A pneumatically operating control installation according to claim 1, characterized by a pressure line, said servo-adjusting means being operatively connected with the pressure line.

3. A pneumatically operating control installation according to claim 2, characterized in that said servo-adjusting motor means includes a diaphragm means for producing adjusting movements holding the control rod means fast in case of pressure failure.

4. A pneumatically operating control installation according to claim 3, characterized in that the control rod means is held fast directly by said servo-adjusting motor means.

5. A pneumatically operating control installation according to claim 3, characterized in that the control rod means is held fast indirectly by the servo-adjusting motor means.

6. A pneumatically operating control installation according to claim 3, characterized in that the control installation operates with vacuum.

7. A pneumatically operating control installation according to claim 3, characterized in that the control installation operates with above-atmospheric pressure.

8. A pneumatically operating control installation according to claim 3, characterized in that the servo-adjusting motor means is provided with a shifting rod which in case of pressure failure engages into toothed means pivotal by the control shifting means, and thereby stops the toothed means.

9. A pneumatically operating control installation according to claim 8, characterized in that the toothed means are pivotal directly by the control shifting means.

10. A pneumatically operating control installation according to claim 8, characterized in that the toothed means is pivotal indirectly by the control shifting means.

11. A control installation according to claim 8, characterized in that the toothed means adjusted together with the headlight by the control rod means engaging at one of the two parts consisting of toothed means and headlight, is constructed as toothed segment with teeth which are directed toward a shifting rod which terminates substantially wedge-shaped and is actuated by the servo-adjusting motor means.

12. A control installation according to claim 11, characterized in that the teeth of the toothed segment are in the shape of knife edges.

13. A control installation according to claim 11, characterized in that the control rod means which is displaceable by a working element pneumatically connected with the control shifting means, engages at an adjusting lever pivotally secured at a headlight, the adjusting lever carries the toothed means, and in that the adjusting lever during its pivot movement pivots the headlight.

14. A control installation according to claim 11, characterized in that the toothed means is connected with the headlight by way of a lever which is pivoted about its pivot axis by the adjusting rod means engaging directly at the headlight.

15. A control installation according to claim 11, characterized in that the toothed means of the toothed segment is in the shape of a circular arc.

16. A control installation according to claim 11, characterized in that in case of pressure failure the wedge-shaped cutting edge of the adjusting rod is operable to be pulled out mechanically out of the knife edges of the toothed means against the pressure of a spring means.

17. A control installation according to claim 3, characterized in that the control rod means controlled by the control shifting means extends through the servo-adjusting motor means, and in that in case of a pressure failure, a spring means is operable to cause slide means running along inclined surfaces to clamp themselves fast at the control rod means and thereby to stop the control rod means.

18. A control installation according to claim 17, characterized in that the control rod means is provided with clamping surface means at those places at which the slide means clamp themselves fast, into which engage complementary surface means arranged at the slide means.

19. A control installation according to claim 18, characterized in that said clamping surface means are roughened up.

20. A control installation according to claim 18, characterized in that clamping surface means include a toothed means.

21. A control installation according to claim 20, characterized in that the complementary surface means include toothed means.

22. A pneumatically operating control installation according to claim 1, characterized in that the servo-adjusting motor means is provided with a shifting rod which in case of pressure failure engages into toothed means pivotal by the control shifting means, and thereby stops the toothed means.

23. A pneumatically operating control installation according to claim 22, characterized in that the toothed means are pivotal directly by the control shifting means.

24. A pneumatically operating control installation according to claim 22, characterized in that the toothed means is pivotal indirectly by the control shifting means.

25. A control installation according to claim 22, characterized in that the toothed means adjusted together with the headlight by the control rod means engaging at one of the two parts consisting of toothed means and headlight, is constructed as toothed segment with teeth which are directed toward a shifting rod which terminates substantially wedge-shaped and is actuated by the servo-adjusting motor means.

26. A control installation according to claim 25, characterized in that the teeth of the toothed segment are in the shape of knife edges.

27. A control installation according to claim 22, characterized in that the control rod means which is displaceable by a working element pneumatically connected with the control shifting means, engages at an adjusting lever pivotally secured at a headlight, the adjusting lever carries the toothed means, and in that the adjusting lever during its pivot movement pivots the headlight.

28. A control installation according to claim 22, characterized in that the toothed means is connected with the headlight by way of a lever which is pivoted about its pivot axis by the adjusting rod means engaging directly at the headlight.

29. A control installation according to claim 22, characterized in that the toothed means of the toothed segment is in the shape of a circular arc.

30. A control installation according to claim 22, characterized in that in case of pressure failure the wedge-shaped cutting edge of the adjusting rod is operable to be pulled out mechanically out of the toothed means against the pressure of a spring means.

31. A control installation according to claim 1, characterized in that the control rod means controlled by the control shifting means extends through the servo-adjusting motor means, and in that in case of a pressure failure, a spring means is operable to cause slide means running along inclined surfaces to clamp themselves fast at the control rod means and thereby to stop the control rod means.

32. A control installation according to claim 31, characterized in that the control rod means is provided with clamping surface means at those places at which the slide means clamp themselves fast, into which engage complementary surface means arranged at the slide means.

33. A control installation according to claim 32, characterized in that said clamping surface means are roughened up.

34. a control installation according to claim 32, characterized in that clamping surface means include a toothed means.

35. A control installation according to claim 34, characterized in that the complementary surface means include toothed means.

* * * * *